US008160396B2

(12) United States Patent
Brand et al.

(10) Patent No.: US 8,160,396 B2
(45) Date of Patent: Apr. 17, 2012

(54) METHOD AND APPARATUS FOR TOUCHING-UP IMAGES

(75) Inventors: Matthew E. Brand, Newtonville, MA (US); Patrick Pletscher, Marthalen (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1166 days.

(21) Appl. No.: 11/951,422

(22) Filed: Dec. 6, 2007

(65) Prior Publication Data

US 2009/0148072 A1    Jun. 11, 2009

(51) Int. Cl.
*G06K 9/62* (2006.01)
*G06K 9/40* (2006.01)
*G06K 9/32* (2006.01)

(52) U.S. Cl. .......................... 382/294; 382/159; 382/275

(58) Field of Classification Search .................. 382/118, 382/173–180, 276, 293–294, 302, 159, 275; 345/619, 648
See application file for complete search history.

(56) References Cited

U.S. PATENT DOCUMENTS

| | | | | |
|---|---|---|---|---|
| 6,661,907 B2 * | 12/2003 | Ho et al. | ........................ | 382/118 |
| 7,020,332 B2 * | 3/2006 | Nenonen et al. | ............... | 382/169 |
| 7,133,565 B2 * | 11/2006 | Toda et al. | ..................... | 382/243 |
| 7,215,831 B2 * | 5/2007 | Altunbasak et al. | ........... | 382/299 |
| 7,248,737 B2 * | 7/2007 | Chakraborty | ................. | 382/176 |
| 7,729,538 B2 * | 6/2010 | Shilman et al. | ................ | 382/181 |
| 7,792,359 B2 * | 9/2010 | Matsuda et al. | ............... | 382/168 |
| 7,864,365 B2 * | 1/2011 | Campbell et al. | .............. | 358/1.9 |
| 2004/0001634 A1 * | 1/2004 | Mehrotra | ........................ | 382/232 |
| 2004/0042659 A1 * | 3/2004 | Guo et al. | ...................... | 382/176 |
| 2005/0281474 A1 * | 12/2005 | Huang | .......................... | 382/239 |
| 2008/0212864 A1 * | 9/2008 | Bornefalk | ...................... | 382/132 |

OTHER PUBLICATIONS

X He, R S Zemel, D Ray. Learning and incorporating top-down cues in image segmentation. 2006.*
Yang Wang; Qiang Ji; , "A dynamic conditional random field model for object segmentation in image sequences," Computer Vision and Pattern Recognition, 2005. CVPR 2005. IEEE Computer Society Conference on , vol. 1, No. pp. 264-270 vol. 1, 2025 Jun. 2005.*
Topi et al "Robust texture classification by subsets of local binary patterns ," Pattern Recognition, 2000. Proceedings. 15th International Conference on , vol. 3, No., pp. 935-938 vol. 3, 2000.*
Matti Pietikainen. Image Analysis with Local Binary Patterns. In Proceedings of SCIA'2005. pp. 115-118.*

* cited by examiner

*Primary Examiner* — Andrae S Allison
(74) *Attorney, Agent, or Firm* — Dirk Brinkman; Gene Vinokur

(57) ABSTRACT

A method and camera apparatus touches up a source image to produce a target image. The source image is partitioned into non-overlapping tiles of pixels. Each tile is labeled. A probability distribution of the labels is inferred, in which the probability distribution is a conditional random field. Weights are determined from the conditional random field. Then, each tile of the source image is transformed according to the weights to produce a corresponding tile of a target image. The transforming maximizes a conditional likelihood of the target image given the source image, while marginalizing over all possible labelings of the source image.

13 Claims, 2 Drawing Sheets

METHOD AND APPARATUS FOR TOUCHING-UP IMAGES

FIELD OF THE INVENTION

This invention relates generally to image processing, and more particularly to touching-up images of faces.

BACKGROUND OF THE INVENTION

Touch-up is the art of removing unwanted features from an image. Touch-up tools are now key feature in many high-end software based photo-editing products. However, the touch-up process is far from automatic. Typically, a user must manually identify and select unwanted features or blemishes, figure out which pixel operations will render the features invisible, and coordinate many such edits so that the final image looks artifact-free.

Because the human eye is much more likely to notice natural blemishes and digital manipulations of images of faces than of general scenes, most touch-up work is done on images of face. However, even working with advanced touch-up tools can be onerous. It is desired to fully automate touch-up inside a camera so that the output image of the camera is actually blemish free.

A common premise of non-photorealistic rendering (NPR) and super-resolution (SR) has the following assumptions. If the surfaces constituting a scene are known, then it becomes possible to determine how the image would appear with small changes to lighting, geometry, and materials. It is significant that touch-up has been more successful in NPR images than in SR images.

One prior art method uses a Markov random field (MRF) that generates a distribution over whole-image patch labelings on the basis of image content and patch-adjacency statistics observed in training images. A maximum a posteriori (MAP) labeling determines new textures. Parameter estimation and inference in MRFs ranges from hard to NP-hard, It is unlikely that a true scene can be estimated precisely and reliably, especially from impromptu images of faces snapped by teenagers with camera equipped mobile phones, especially in harshly lit indoor scenes.

SUMMARY OF THE INVENTION

The embodiments of the invention provide a method and apparatus for touching-up an image acquired of a scene by a camera. The method makes inferences about how surfaces in the scene should appear. Likelihoods of surfaces classes are determine for all pixels using a conditional random field (CRF) and a weak scene grammar. Then, various image transforms are applied to the source image, depending on an induced distribution over labels in each region of the image. Parameters governing the labeling and transforms are jointly estimated from a set of before-and-after training images.

The system can correct red-eye, reduce specularities, and remove acne and other blemishes from images of faces.

The invention has major differences from conventional touch-up tools. One objective seeks a target image that is most likely with respect to all possible interpretations of the source image, i.e., the method attempts to marginalize out the labeling. In addition, the method uses a scene grammar to substantially improve statistical inference and learning. Furthermore, the likelihoods of the labels are obtained from a CRF, which is trained discriminatively.

CRFs are preferred to conventional Markov random fields (MRFs), because, unlike MRFs, none of the representational capacity of the model is wasted on patterns in the training images that are irrelevant to the inference task. Finally, the method 'learns' to use repair texture from elsewhere in the same image.

DETAILED DESCRIPTION OF THE PREFERRED EMBODIMENTS

The embodiments of the invention provide a method for touching up a source image to produce a target image. A probability distribution of pixels in a source image is inferred. The probability distribution is then used to guide a transformation of a set of image tiles to produce the target image.

A low-level pixel classifier estimates evidence for a number of classes of image transforms specialized for pixel classes that roughly correspond to shadowed skin, lips, gums, eyebrows, sclera, iris, pupils, teeth, nostrils, background, and the like. These can be obtained from appropriate training images of the types of objects to be touched-up. The class likelihoods, in turn, guide local texture filtering or replacement to yield a re-synthesized target image. The classes have associated labels.

The class evidence is combined with a weak scene grammar and learned statistics of face layout in a conditional random field (CRF), yielding class likelihoods for each pixel, which are indicated by a maximum marginal likelihood label at each pixel.

The enhancing transforms can remove blemishes and defects in the image, removing unwanted artifacts of the image capture process such as motion blur, pixel noise, and secularities. The method can touch-up blemishes, wrinkles, red-eyes, teeth, oily skin secularities, and other undesired artifacts.

The transforms can also replace lost detail and resolution by using and transforming detail from elsewhere in the image or other images. The method is trained discriminatively on before-and-after examples, and uses 'hint' labelings to speed up the training. In addition to touching up images, the method can also work on audio and video signals, time-series data, and mesh data. The entire process is automatic and trained discriminatively from before-and-after training images. It should be understood, that with appropriate training images, other types of scene or object can be touched-up.

Inference Framework

Figure 1:
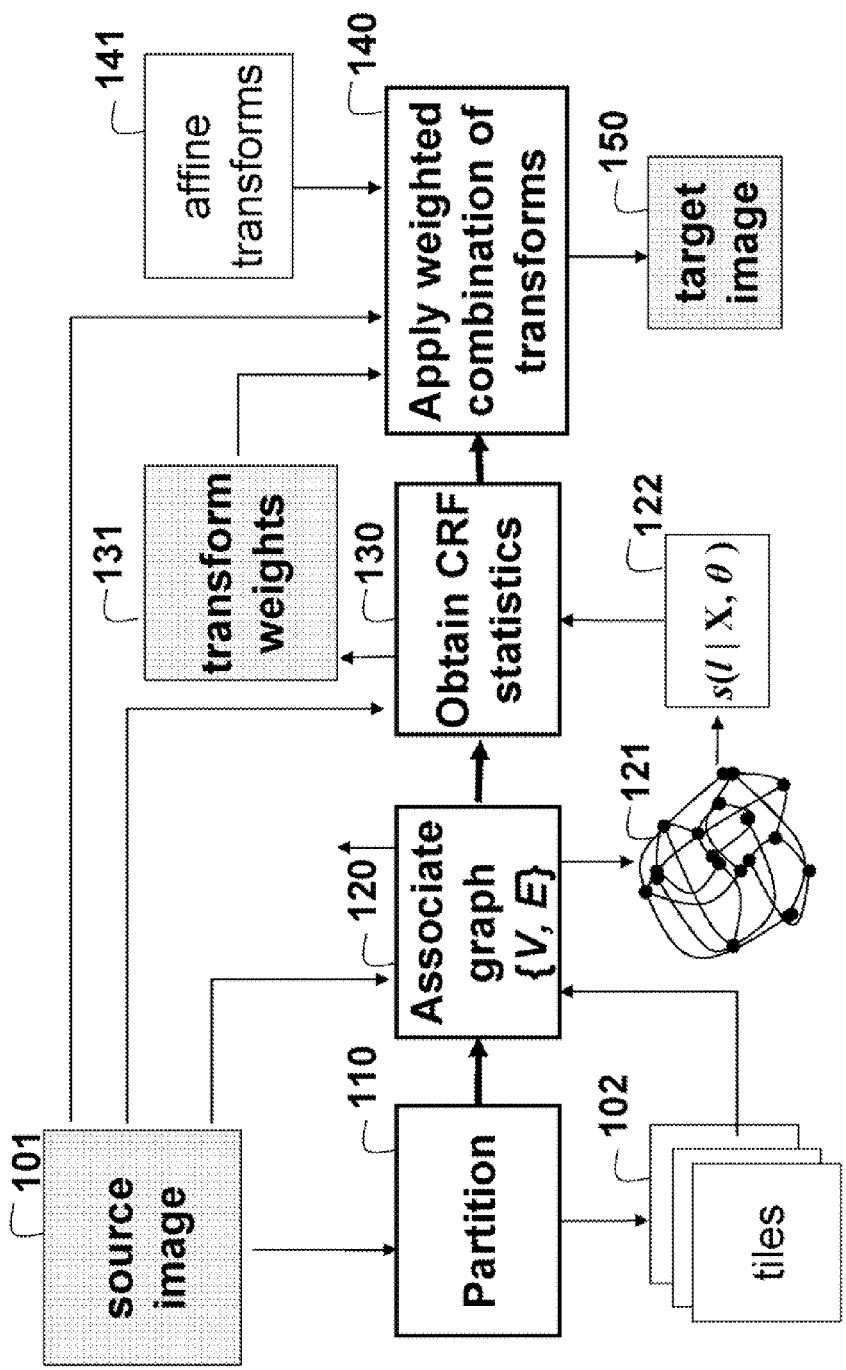
FIG. 1 is a flow diagram of a method for touching up a source image to produce a target image according to an embodiment of the invention.

As shown in FIG. 1, a source image X 101 is partitioned 110 into non-overlapping tiles 102; the content (pixel intensities) of each tile is represented by a vector $x_i$. Each tile can include one or more pixels. The vectors can be a linerisation of the pixel intensities. The tiles are labeled.

Example tile sizes, in terms of pixels, are 1×1, 2×2, 4×4, 6×6, and 8×8. Larger tiles have more texture, which facilitates inference and synthesis. On the other hand, larger tile might span different classes of surfaces, e.g., eyes and eyebrows.

The tiles 102 are also associated 120 with a graph $\{V, E\}$ which specifies a connectivity of a conditional random field (CRF) 121. The CRF indicates how labels of adjacent tiles are mutually constrained by logical or statistical information. In the CRF, V represents the vertices, and E the edges connecting the vertices. The vertices represent random variable whose probability distribution is to be inferred, and the edges represent dependencies between the random variables of the vertices connected by the edges. Each random variable can be set to one of a finite set of labels, obtained during training.

The CRF specifies a function s( ) 122 which determines a score for any joint labeling l for random variables in the CRF, or, equivalently, all tiles in an image. The score s is determined $$s(l \mid X, \theta) = \sum_{i \in \mathcal{V}} e_{l_i}^T \theta_1 f_i(X) + \sum_{ij \in \mathcal{E} \mid i > j} e_{l_i}^T \theta_2 e_{l_j}, \quad (1)$$

where $l_i$ is the label at the $i^{th}$ tile; $e_{l_i}$ is a canonical indicator vector, e.g., if $l_i$=3, then $e_{l_i}$=[0, 0, 1, 0, . . . ,0]; $f_i(X)$ is a vector of features giving evidence for each possible labeling of the $i^{th}$ tile; and $\theta_1, \theta_2$ are matrices of parameters that score a label of a compatibility of a vertex with the evidence ($\theta_1$), and the labels of neighboring vertices ($\theta_2$).

We prevent labeling impossible combinations, e.g., an eyebrow adjoining teeth, by 'clamping' the value of the parameters associated with such combinations to $-\infty$, in practice, a constant much smaller than zero. This is a weak grammatical constraint. Stronger grammatical constraints, e.g., the eye must lie next to the nose-bridge and can only contain sclera, iris, pupil, eyelash, and secularities, can be encoded in the graph {V, E} by adding layers of vertices and edges with restrictions on their possible labelings.

The CRF 121 is an undirected graph in which each vertex represents a random variable whose distribution, given evidence, is to be inferred, and each edge represents a dependency between two adjacent random variables. In other words, the CRF indicates a normalized probability distribution p over all possible joint labelings of the graph, for the source image, $$p(l \mid X, \theta) = \exp s(l \mid X, \theta) \Big/ \sum_{l \in \mathcal{L}^N} \exp s(l \mid X, \theta). \quad (2)$$

We determine 130 statistics of this probability distribution; and from these statistics we obtain weights 131 that control die synthesis 140 of a target image 150 as the tiles of the source files are transformed.

In particular, each tile in the target image is synthesized as a weighted mixture of (affine) image transforms 141 applied 140 to corresponding tiles in the source image. Each transform is associated with a particular label, and each weight is determined from the statistics of the probability distribution p in Equation (2).

In one preferred embodiment, we view the transform 140 as noisy affine operator in the gradient domain:

$$h(y_i) = W_{l_i} \begin{bmatrix} g(x_i) \\ 1 \end{bmatrix} + v_l, \quad (3)$$

where $g(\cdot)$ and $h(\cdot)$ are differentials of the source and target image tiles, respectively; $W_l$ is a label-specific affine parameter matrix that specifies the transform; and random variable $v_l$, accounts for noise or error. Nonlinear transformations, e.g., a median filter, and other domains, e.g., Laplacian and wavelet, can also be accommodated. The distribution of the random variable $v_l$ determines an prediction likelihood function $$p(y_i \mid l_i, x_i, \theta).$$

We assume that $v_l \sim N(0, I)$ is normally distributed, and that the spread of this distribution is independent of the label l.

We seek the synthesized target image 150 that has a maximum conditional likelihood given the source image, marginalizing over all possible image labelings, where the target image Y 150 is tiled like the source image and represented by vectors $y_i$. This is expressed as:

$$p(Y \mid X, \theta) \propto \sum_{l \in \mathcal{L}^N} p(l \mid X, \theta) \prod_i p(y_i \mid l_i, x_i, \theta). \quad (4)$$

In general, the above maximization is intractable and non-convex. We apply a log-sum inequality to the right hand side of Equation (4), and rearrange the sums to show that the conditional log-likelihood of the target image Y is lower-bounded by a weighted sum of the negated prediction errors (log-likelihoods), each weighted by the marginal likelihood of the label assigned to that tile.

$$\log \sum_{l \in \mathcal{L}^N} p(\ell \mid X, \theta) \prod_{i \in \mathcal{V}} p(y_i \mid l_i, x_i, \theta) \geq \quad (5)$$

$$\sum_{l \in \mathcal{L}^N} p(l \mid X, \theta) \sum_{i \in \mathcal{V}} \log p(y_i \mid l_i, x_i, \theta) =$$

$$\sum_{i \in \mathcal{V}, j \in \mathcal{L}} \log p(y_i \mid l_i = j, x_i, \theta) \sum_{l \in \mathcal{L}^N \mid l_i = j} p(l \mid X, \theta) =$$

$$\sum_{i \in \mathcal{V}, j \in \mathcal{L}} (\log p(y_i \mid l_i = j, x_i, \theta)) \cdot p(l_i = j \mid X, \theta)$$

The lower bound is 'tight' when the distribution over the labelings p(l|X, $\theta$) has a low entropy, and reaches equality when the probability mass is concentrated on a single labeling.

By determining the label marginal probability $$p(l_i = j \mid X, \theta),$$

we infer the likelihood of a specific label at a specific tile, marginalized over all possible image labelings. In the preferred embodiment, using the label marginal probability as a transform weight 131 maximizes the lower bound.

To determine the marginal probabilities, there are known approximations with bounded suboptimality. For an empirical comparison of these approximations, see Szeliski et al, incorporated herein by reference.

Both inference and parameter estimation can be done effectively by maximizing this lower bound on the likelihood of the target image Y 150. Indeed, all the sub-problems we describe below are convex. For the inference of the target image Y, Equation (5) tells us to select the target image that has a minimal prediction error $$\log p(y_i \mid l_i = j, x_i, \theta),$$

with regard to the marginal likelihoods of the labels of the tiles.

With a normally distributed random variable v, this becomes a sparse least-squares problem, where we seek $\{y_i\}_{i=1\ldots N}$ that minimize the squared difference between the two sides of Equation (3), summing over all tiles and labels, and weighted by the label marginal likelihoods. In one preferred embodiment of the invention, this is accomplished by applying all possible transforms 141 to each tile, and forming a weighted combination of their outputs, using as weights 131 the marginal probabilities of the labels at that tile 102.

For parameter estimation, the same system of linear equations can be solved for the optimal affine transforms $\{W_i\}_{i=1,\ldots,L}$ 141, given paired training images, and marginal likelihoods of the labels for the source image X. This maximizes the lower bound, while holding the CRF parameters fixed. To estimate the CRF parameters while holding the transforms fixed, we optimize the lower bound $$p(Y|X,\theta) \geq p(Y|l_{max},X)p(l_{max}|X,\theta),$$

where $l_{max}$ is the labeling giving a lowest prediction error. We maximize this bound by ascending the gradient $$\frac{d}{d\theta_2}\log p(l_{max}|X,\theta) = \{\langle e_i e_j\rangle_{p(l_{max})=1} - \langle e_i e_j\rangle_{p(l|X,\theta)}\}^{ij},$$

and similarly for $\theta_1$. Here, $\langle e_i e_j\rangle p(\cdot)$ is the expectation, under the specified distribution over the labelings, of the outer product between the label indicator vectors at any two neighboring tiles.

The gradient is the difference in the marginal likelihoods of labels in $l_{max}$ compared to that of the distribution specified by $\theta$. We also derive a tighter nontrivial bound that considers all labelings. However, the trivial bound turns out to be remarkably effective and computationally much less demanding.

Finally, because our bounding arguments benefit from low-entropy distributions, we can also use a sparsity-promoting $L_1$ prior probability on the parameters:

$$p(\theta_{ij}) \propto e^{-|\theta_{ij}|}$$

Each alternating optimization of the transformation parameters and the CRF parameters adjusts the label categories discriminatively so that the prediction accuracy is increased. Note that the resulting classes are optimized for image touch-up rather than for tissue identification, so the max-marginal images are not face segmentations, just indications of the most heavily weighted filter at each pixel.

Implementation

Training source images, with a variety of skin types, ages, and complexions of faces, are acquired via the internet web. Many of the images are informal self-portraits taken with low resolution mobile phone cameras and web cameras under various unfavorable lighting conditions, and posted to acne discussion boards on the web. Poses, lighting, and lens distortions vary widely, and in an unknown manner.

From each training image, a blemished or unblemished training target image 150 is constructed via manual touch-up, as well as a "hint" image containing preferred labels for each pixel. Images are roughly cropped to the face, as can be done with in-camera face-detectors. For example, the cropped image extends from the forehead to the chin.

To reduce lighting and gamut bias, the color space of each training image is affinely projected onto axes of a principle component analysis (PCA) estimated from pixels in a central region, see Heeger et al., "Pyramid-based texture analysis/synthesis," in SIGGRAPH '95: Proceedings of the 22nd annual conference on Computer graphics and interactive techniques, pp. 229-238 1995, incorporated herein by reference.

Some images were used for training, and the remainder of the images for testing of the training. For convenience, we modularized the optimization into three parts: a low-level pixel classifier that produces the evidence vectors; a CRF that uses the classifier output as input; and a set of affine transforms 141 that map suitably labeled texture tiles in a training source image to the corresponding tiles in the training target image.

These can be combined as a favorable parameter initialization of Equation (4), then jointly improved by gradient ascent to a point of diminishing returns. In practice, very few iterations are needed to obtain good results on the test images.

For the initial low-level classifier, a linear support vector machine (SVM) is estimated to distinguish tiles "belonging" to each different classes. Each tile is represented by a vector of responses from oriented multi-scale Gabor filters.

The pairwise SVM scores, i.e., distance of a point from a separating hyperplane of the SVM, measured as multiples of the margin, are mapped via a tanh sigmoid functions ($\xi$) to pseudo-probabilities, which are multiplied to yield the class pseudo-likelihoods that are used as evidence in the CRF, see Wu et al., "Probability estimates for multi-class classification by pairwise coupling, Journal of Machine Learning Research 5, pp. 975-1005 2004, incorporated herein by reference.

The CRF parameters are initialized using pair-wise statistics of the labels in the 'hint' images and images of low level classifier responses. This yields fairly competent segmentations, even without further training.

For the affine transforms, the source and the target images are moved into the gradient domain by finite differencing. Then, all target tiles belonging to any specific label are regressed affinely onto the corresponding source tiles, yielding class-specific affine transforms 141. Nearby tiles of source texture from other classes are also incorporated into the regression, where the tiles are favored to the degree that they predict the local target texture better than the local source texture. A parallel process is employed in the inference.

This enables the system to learn to use nearby texture when 'replacing' undesirable textures, such as skin sores, with healthier looking skin texture. For classes with insufficient samples, the least-squares regression is regularized with small diagonal values.

Given a novel (not training) source image 101, low-level class scores are determined by using the multi-class SVM to obtain the labels. The CRF marginal likelihood of each label at each tile is determined using loopy belief propagation, see Yedidia et al., "Generalized belief propagation," in NIPS, pp. 689-695, 2000, incorporated herein by reference.

For classes whose transforms use multiple source textures, such as a blemish, nearby examples of texture with other labels are located and incorporated into the affine transform 140. The affine transforms are then weighted according to the marginal probabilities and summed using the weights 131. The resulting gradient image is re-integrated to yield the target image 150. It should be noted that the transforms and reintegration can be combined into a single step.

Figure 2:
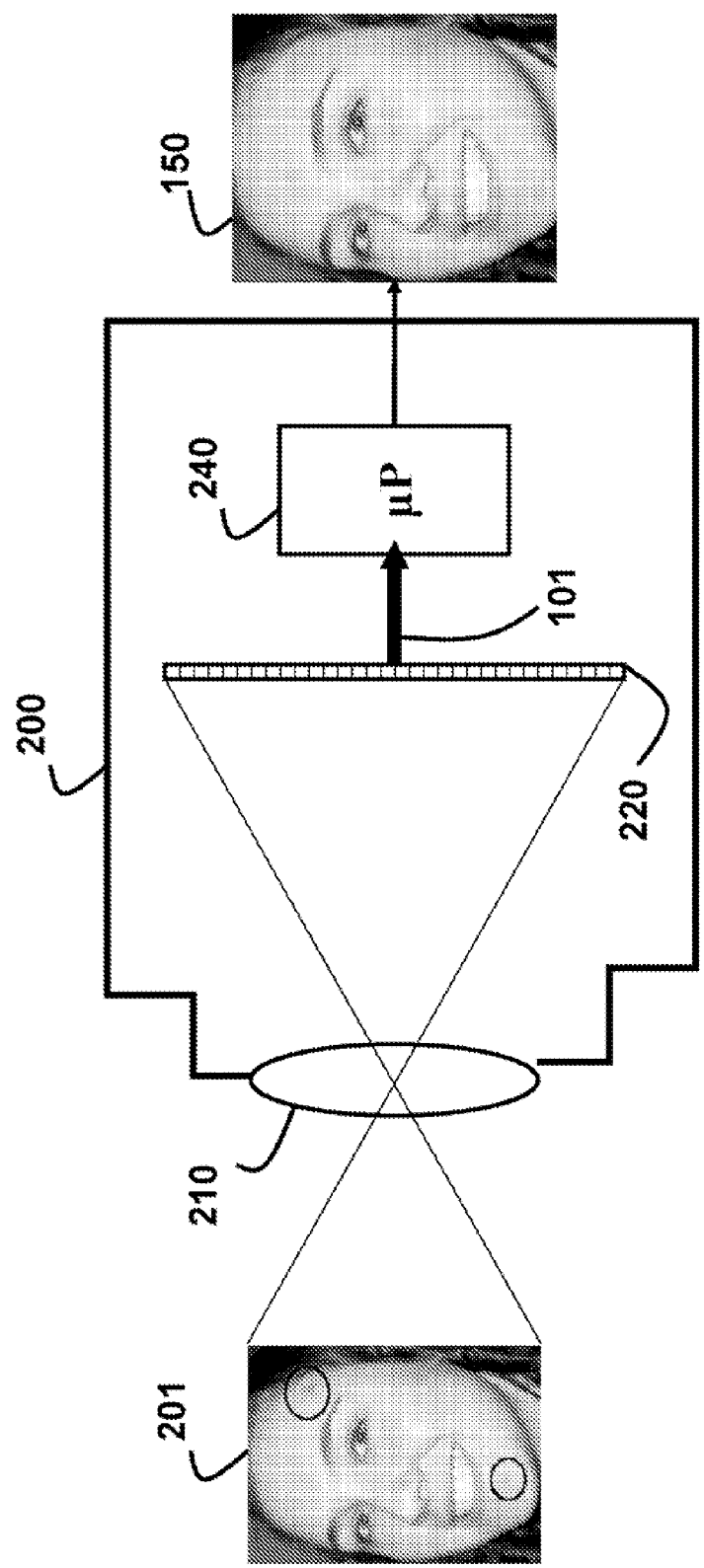
FIG. 2 is a block diagram of a system for touching up images an embodiment of the invention.

FIG. 2 shows a camera 200 for touching up a source image 101 acquired of a scene 201 to produce the target images 150. The camera includes a lens 210, a sensor 220, and a microprocessor ($\mu$P) 240, which implements the method described above.

EFFECT OF THE INVENTION

Although our method marginalizes over the labelings, we find that the resulting CRF distribution had sufficiently low entropy to yield good segmentations and re-synthesis from two fairly weak discrete approximations of the distribution over labelings: the MAP image labeling; and the max-marginal labeling, which selects the most marginally likely label at each tile.

This suggests that a suitably trained CRF could be deployed in a camera with very fast approximate inference methods, such as min-cut, with fairly minor degradation of output quality. Our framework is general and can be applied to sampled signals of any kind and dimension, using any family of parameterized transforms. As long as the signal components are differentiable, the parameters governing all stages of the inferences process can be jointly optimized.

We can obtain even better label likelihoods by training the CRF directly on image features, instead of the SVM outputs, at a cost of considerably more computations. The source-to-target transforms can be constrained to ignore stray pixels of foreign source texture, e.g., unwanted facial hair. Additional classes can be introduced, for example, to allow different treatment of eyelashes and eyebrows. A stronger grammar can be imposed by introducing directed edges varied labeling restrictions to enforce the geometric schema of faces.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for touching up a source image to produce a target image, comprising:
    partitioning a source image into non-overlapping tiles of pixels;
    labeling each tile with a label;
    inferring a probability distribution of the labels, in which the probability distribution is a conditional random field;
    determining weights from the conditional random field; and
    transforming each tile of the source image according to the weights to produce a corresponding tile of the target image, in which the transforming maximizes a conditional likelihood of the target image given the source image, while marginalizing over all possible labelings of the source image, in which the transforming is an affine operator in a gradient domain:

$$h(y_i) = W_{l_i} \begin{bmatrix} g(x_i) \\ 1 \end{bmatrix} + v_l, \qquad (3)$$

where $g(x_i)$ and $h(y_i)$ are differentials of the tiles of the source image and the target image, respectively, and $W_{e_i}$ is a matrix of the weights, and $v_e$ accounts for noise.

2. The method of claim 1, in which the conditional likelihood of the target image is approximated using inferred statistics of the conditional random field.

3. The method of claim 2, in which the inferred statistics include a posteriori labeling and marginal probabilities.

4. The method of claim 1, in which the transformation uses weighted affine transforms, and in which parameters of the conditional random field and the affine transforms are estimated from a training set of paired source and target images and optional labeling hint images.

5. The method of claim 1, in which the source image is of a face.

6. The method of claim 1, in which the labels are obtained from training images similar to the source image.

7. The method of claim 5, in which the touching up correct red-eyes, reduces specularities, and remove acne, blemishes and motion blur from the face.

8. The method of claim 1, further comprising:
    inferring a probability distribution of pixels in the source image.

9. The method of claim 8, further comprising:
    specifying a connectivity of the conditional random field using a graph, in which vertices represent random variables whose probability distribution is to be inferred, and the edges represent dependencies between the random variables of the vertices connected by the edges, and each random variable is one of a finite set of the labels obtained during training.

10. The method of claim 1, in which the labels are assigned to the tiles by a classifier using trained classes.

11. The method of claim 10, in which the trained classes include shadowed skin, lips, gums, eyebrows, sclera, iris, pupils, teeth, nostrils, and background.

12. The method of claim 1, further comprising:
    preventing impossible labeling combinations of the tiles.

13. A camera for touching up a source image to produce a target image, comprising:
    means for partitioning a source image acquired from a sensor of the camera into non-overlapping tiles of pixels;
    means for labeling each tile with a label;
    means for inferring a probability distribution of the labels, in which the probability distribution is a conditional random field;
    means for determining weights from the conditional random field; and
    means for transforming each tile of the source image according to the weights to produce a corresponding tile of a target image, in which the transforming maximizes a conditional likelihood of the target image given the source image, while marginalizing over all possible labelings of the source image, in which the transforming is an affine operator in a gradient domain:

$$h(y_i) = W_{l_i} \begin{bmatrix} g(x_i) \\ 1 \end{bmatrix} + v_l, \qquad (3)$$

where $g(X_i)$ and $h(Y_i)$ are differentials of the tiles of the source image and the target image, respectively, and $W_{e_i}$ is a matrix of the weights, and $V_e$ accounts for noise.

* * * * *